Dec. 3, 1963     C. KLEESATTEL ETAL     3,113,225
ULTRASONIC VIBRATION GENERATOR
Filed June 9, 1960     3 Sheets-Sheet 1
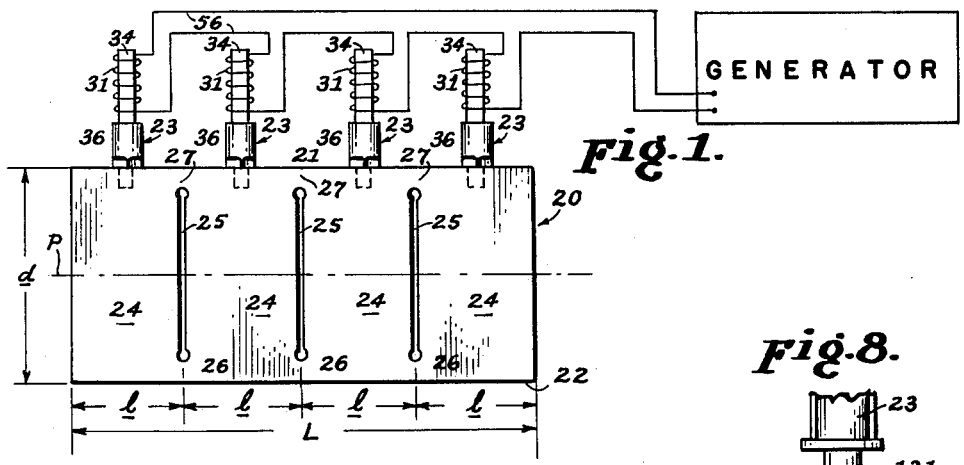
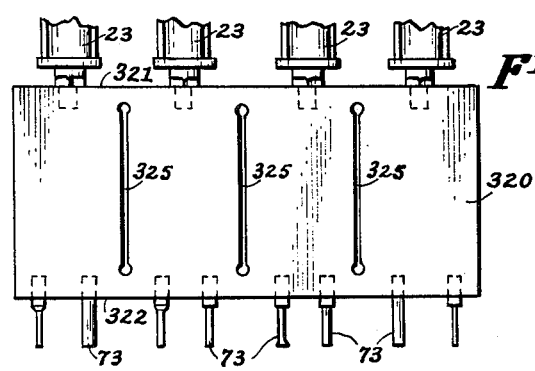
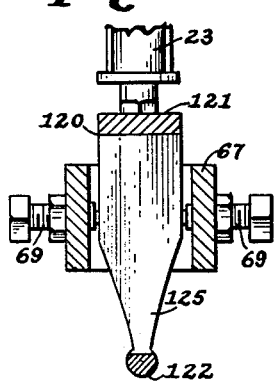
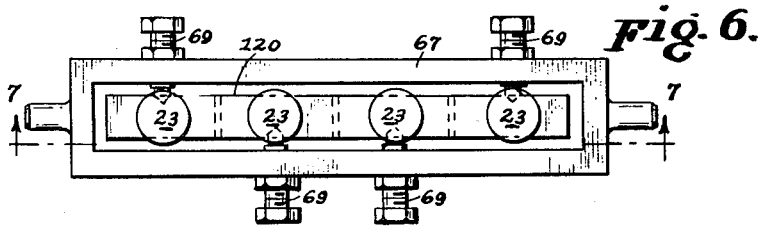
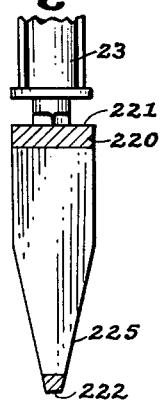
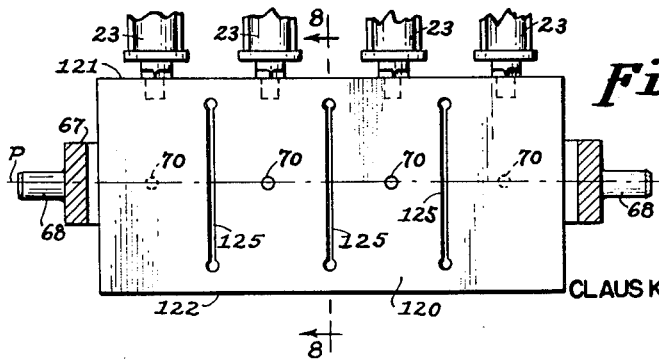
INVENTORS
CLAUS KLEESATTEL, LEWIS BALAMUTH
& ARTHUR KURIS
BY
ATTORNEY Dec. 3, 1963  C. KLEESATTEL ETAL  3,113,225
ULTRASONIC VIBRATION GENERATOR
Filed June 9, 1960  3 Sheets-Sheet 2
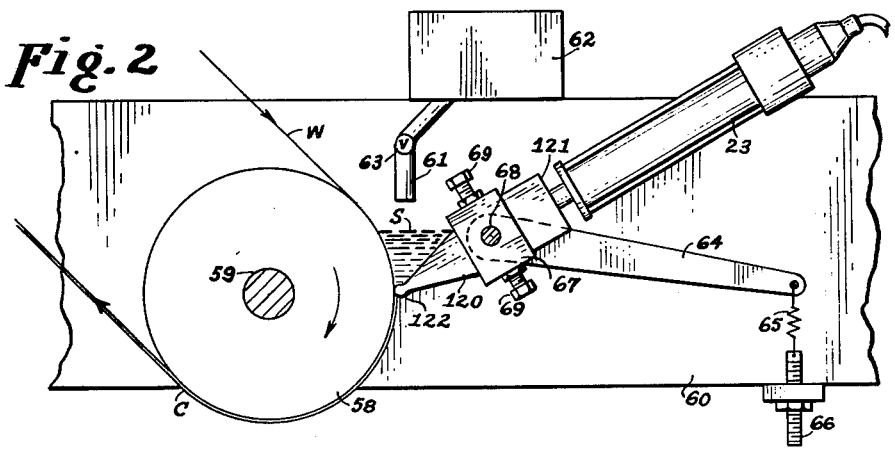
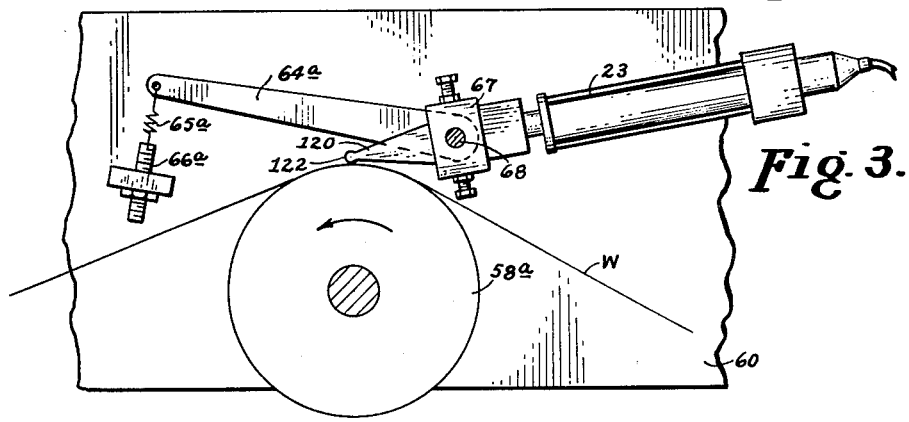
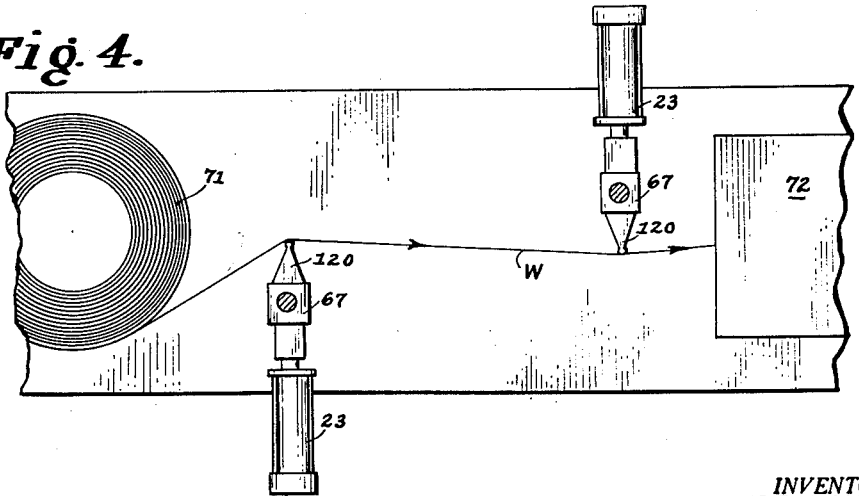
INVENTORS
CLAUS KLEESATTEL, LEWIS BALAMUTH
& ARTHUR KURIS
BY
ATTORNEY

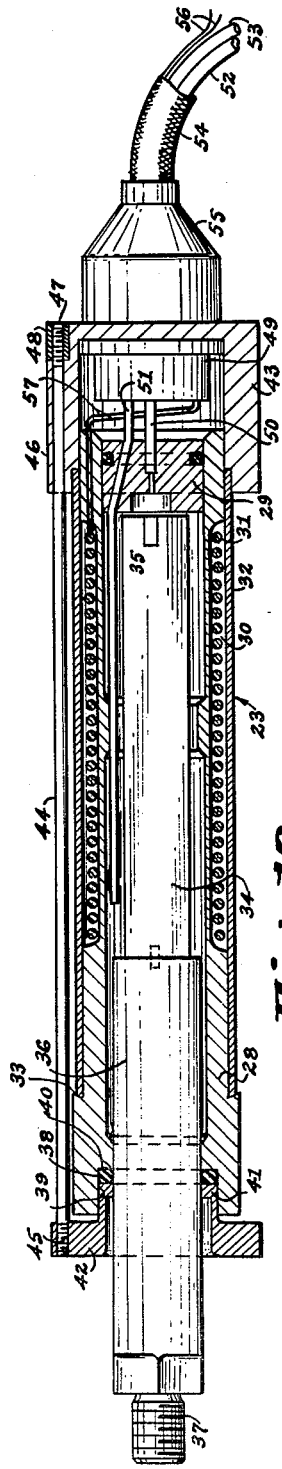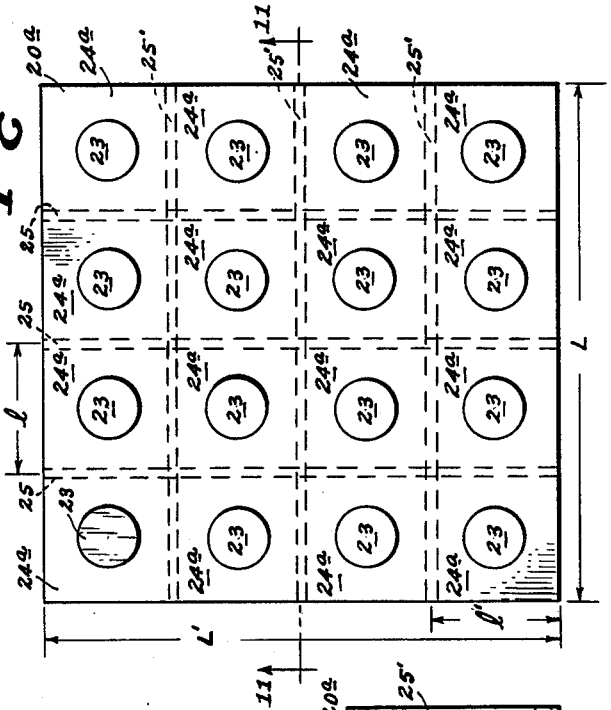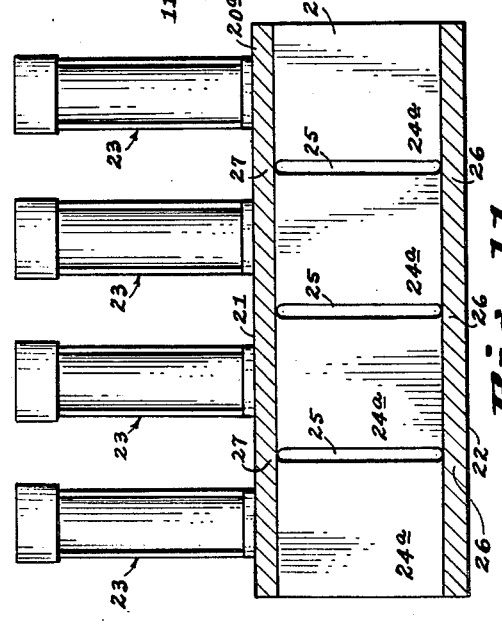

United States Patent Office 3,113,225
Patented Dec. 3, 1963

3,113,225
ULTRASONIC VIBRATION GENERATOR
Claus Kleesattel, Forest Hills, Lewis Balamuth, New York, and Arthur Kuris, Riverdale, N.Y., assignors to Cavitron Ultrasonics Inc., Long Island City, N.Y., a corporation of New York
Filed June 9, 1960, Ser. No. 35,057
7 Claims. (Cl. 310—26)

This invention relates generally to ultrasonic devices and, more particularly, is directed to vibration transmitting members having large dimensions in planes perpendicular to the direction of the vibrations to be transmitted.

When vibratory energy is introduced at a restricted area of one surface of a vibration transmitting member for utilization at an opposed surface thereof, vibrations having uniform amplitudes, that is, a plane wave front, can be obtained at that opposed surface only if the dimensions of the vibration transmitting member in planes perpendicular to the direction of the vibrations to be transmitted do not exceed a predetermined value which is a function of the wavelength of the vibrations, as determined by the nature of the material forming the vibration transmitting member and the frequency of the vibrations. Generally, the maximum dimension in planes perpendicular to the direction of the vibrations may not exceed one-third the wavelength of the vibrations. Thus, for example, in the case of a vibration transmitting member formed of Monel metal with the configuration of a cylinder or block and having vibrations introduced at the center of one end surface from a conventional electromechanical transducer at a frequency lying in the range of from 20 to 25 kc./sec., a plane wave front is obtained at the opposite or output end surface only if the maximum dimensions in planes parallel to the end surfaces do not exceed 3 inches. If such dimensional limits are not observed, the vibrations at the output surface have greater amplitudes at the center than at the periphery of the output surface. The foregoing phenomenon obviously limits the uses to which such vibration transmitting members can be applied. Although the maximum dimensions of the vibration transmitting member in planes parallel to the input and output surfaces can be increased beyond the limits indicated above by providing a transducer having correspondingly increased lateral dimensions, the costs of producing such a transducer and the energizing winding therefor become prohibitive, and the increased bulk of the entire assembly is also disadvantageous.

Previous attempts to obtain a plane wave front at the output surface of a vibration transmitting member having large dimensions in planes parallel to the input and output surfaces have employed a number of transducers for introducing the vibrations at locations on the input surface which are spaced apart by distances smaller than the limiting dimension for plane wave transmission in the material of which the vibration transmitting member is formed. However, the portions of the vibration transmitting member which are excited by vibrations introduced therein from the related transducers have Poisson couplings therebetween at the nodal plane or planes, and these couplings produce complex interactions between the vibrations in the several portions of the vibration transmitting member so that in phase vibrations of uniform amplitude cannot be conveniently realized over the entire area of the output surface.

Accordingly, it is a general object of this invention to provide vibration transmitting members having one or more large dimensions in planes parallel to the input and output surfaces, and which attain a plane wave front, that is, in phase vibrations of uniform amplitude, over the entire area of the output surface, in response to the introduction of vibrations at suitably spaced apart locations on the input surface.

A more specific object is to provide blade-like vibration transmitting members having elongated input and output surfaces and which are constructed so that vibratory energy introduced at spaced apart locations along the input surface of such a member produces vibrations with a plane wave front along the entire output surface, whereby the blade-like member can be employed as a substantially friction-free guide for a web of sheet material or the like moving across the vibrated output surface, or as a knife blade or machining or cutting tool, or as a means for transmitting uniform vibrations to a number of tools secured to the output surface.

Another object is to provide means by which a long, blade-like vibration transmitting member having the above characteristics may be suspended from supports at the opposite ends thereof while avoiding bending between such supports without giving excessive thickness to the blade-like member and thereby increasing the power required for driving the latter.

A further object is to provide a mounting means for a long, blade-like vibration transmitting member which avoids interference with the transmission of vibrations by the latter.

In accordance with an aspect of the invention a vibration transmitting member having one or more large dimensions in planes parallel to the input and output surfaces is excited by vibrations introduced therein from a number of transducers at locations on the input surface which are spaced apart in the direction of each large dimension, and the vibration transmitting member is formed with slots extending therethrough between the locations of the transducers in planes which are at right angles to the input and output surfaces and to the direction of each large dimension, so that such slots break the Poisson couplings between the portions of the vibration transmitting member receiving vibratory energy from the respective transducers and the portions separated from each other by the slots can act as individual vibration transmitting elements having maximum dimensions in planes parallel to the input and output surfaces which are within the limits producing a plane wave front for the material in question.

The several portions of the vibration transmitting member defined by the slots therebetween are preferably connected to each other by narrow connecting bridges at least adjacent the output surface which represents a loop of longitudinal motion for each portion so that, in the event of slight differences between the operating frequencies of the several transducers, the connecting bridges serve as sufficient couplings between the parts of the output surface to ensure the in-phase, uniform vibration thereof.

If the vibration transmitting member is in the form of a long blade having its longitudinal edges as the input and output surfaces, the slots for breaking the Poisson couplings extend only transversely through the blade. However, if the vibration transmitting member is in the form of a rectangular block having long side surfaces, then the slots for breaking the Poisson couplings can be in a grid arrangement.

In accordance with another aspect of this invention, a vibration transmitting member in the form of a long blade is advantageously suspended from supports at the opposite ends thereof by means of a rigid frame extending around the blade and carried by such supports, and clamping screws extending through the frame and engaging the blade at a nodal plane of the latter so as to avoid damping of the vibrations transmitted from one longitudinal edge to the other longitudinal edge of the blade. With such an arrangement, the rigid frame adequately supports the blade to avoid bending of the latter, while the blade can be relatively thin so as to minimize the power that is required to produce the desired vibrations at the output edge surface of the blade.

The above, and other objects, features and advantages of the invention, will be apparent in the following detailed description of illustrative embodiments thereof which is to be read in connection with the accompanying drawings forming a part hereof, and wherein:

FIG. 1 is a diagrammatic elevational view of a blade-like vibration transmitting member embodying the present invention;

FIG. 2 is a diagrammatic side elevational view illustrating the use of a blade-like vibration transmitting member of the kind illustrated in FIG. 1 in the coating of paper or other sheet material in web form;

FIG. 3 is a view similar to that of FIG. 2, but illustrating the use of a blade-like vibration transmitting member of the kind illustrated in FIG. 1 in the glossing or compacting of a paper web;

FIG. 4 is a diagrammatic side elevational view illustrating the use of blade-like vibration transmitting members of the kind illustrated in FIG. 1 as substantially friction-free guides for a web of paper or other sheet material;

FIG. 5 is a front elevational view of a blade-like vibration transmitting member of the kind illustrated in FIG. 1, and showing the use of such a member for simultaneously operating a number of tools;

FIG. 6 is a top plan view showing an advantageous mounting arrangement for a blade-like vibration transmitting member of the kind illustrated in FIG. 1;

FIG. 7 is a sectional view taken along the line 7—7 of FIG. 6;

FIG. 8 is a sectional view taken along the line 8—8 of FIG. 7, and showing the cross-sectional configuration of a blade-like vibration transmitting member which is intended for use in the coating or glossing of a paper web, as in FIGS. 2 and 3, respectively, or for the friction-free guiding of a web, as in FIG. 4;

FIG. 9 is a sectional view similar to that of FIG. 8, but showing the cross-sectional configuration of a blade-like vibration transmitting member intended for use as a machining or cutting tool;

FIG. 10 is a top plan view of a vibration transmitting member embodying the present invention and having large dimensions in two right angularly related directions lying in planes parallel to the input and output surfaces thereof;

FIG. 11 is a sectional view taken along the line 11—11 of FIG. 10; and

FIG. 12 is an axial sectional view, on an enlarged scale, of a preferred form of vibratory mechanism to be used for introducing vibratory energy into vibration transmitting members embodying the present invention.

Referring to the drawings in detail and initially to FIG. 1 thereof, it will be seen that a blade-like vibration transmitting member embodying the present invention, and there generally identified by the reference numeral 20, has input and output surfaces 21 and 22, respectively, defined by the opposite longitudinal edges. It is intended to effect vibration of the output surface 22 in directions perpendicular to the longitudinal axis of the blade-like member in response to the introduction of similarly directed vibratory energy at the input surface 21.

As is usual, the depth $d$ of the blade is equal to a half-wavelength of the blade-like member, or multiples thereof, at the frequency at which the blade-like member is to be vibrated. If the width or length L of the blade-like member does not exceed a predetermined value which is dependent upon the wavelength of the vibrations in the material of which the vibration transmitting member is formed, for example, a width or length of three inches in the case of Monel metal vibrated at a frequency in the range of 20 to 25 kc./sec., then an electro-mechanical transducer can be employed for introducing the vibratory energy at a central location along the input surface 21, and the vibrations at the output surface 22 will have a plane wave front, that is, such vibrations will have a uniform amplitude along the entire output edge or surface. However, if the width or length L of the vibration transmitting member exceeds the above mentioned predetermined value, as in the blade-like vibration transmitting member 20 of FIG. 1, then the introduction of the vibratory energy only at the center of the input surface 21 will produce vibrations of the output edge or surface 22 which have a maximum amplitude at the central portion of such output edge and decreasing amplitudes towards the opposite ends of the output edge or surface.

As represented diagrammatically in FIG. 1, the present invention solves the problem of attaining a plane wave front along the entire output edge or surface 22 by introducing the vibratory energy into the blade-like vibration transmitting member 20 at a plurality of locations on the input edge or surface 21 which are equally spaced apart along the latter by distances which are less than the previously mentioned maximum width or length for plane wave front transmission in the material and at the frequency in question. The several vibratory mechanisms 23 which are employed for introducing vibratory energy at a plurality of locations are centered with respect to portions 24 of the vibration transmitting member 20 each having a width or length $l$ that is smaller than one-third the wavelength of the vibrations to be transmitted.

If the blade-like vibration transmitting member 20 is formed of Monel metal and is vibrated at a frequency in the range of 20 to 25 kc./sec., the wavelength of such vibrations is approximately 9 inches, so that the width or length $l$ of each portion 24 thereof, and hence, the distances between the successively arranged vibratory mechanisms 23, has a maximum value of approximately 3 inches. Thus, in the case of a vibration transmitting member having a total length L equal to 10 inches, each portion 24 of the vibration transmitting member can conveniently have a width or length $l$ equal to 2.5 inches under the conditions indicated above, while the vibratory mechanisms 23 are spaced from each other by the same distance and those closest to the ends of the member 20 are spaced from such ends by a distance of 1.25 inches.

When the height or depth $d$ of vibration transmission member 20 is equal to a half-wavelength, or multiples thereof, and the vibratory mechanisms 23 introduce vibrations at input surface 21 in directions perpendicular to the longitudinal axis of the blade-like vibration transmitting member, that is, in vertical directions as viewed in FIG. 1, the output surface 22 is at a loop of longitudinal motion for each portion 24, that is, the output surface 22 is made to vibrate in the same direction as the vibrations introduced by the vibratory mechanisms 23. Further, there is a nodal plane P located between the input and output surfaces 21 and 22 at which there is no vibration in the direction of the introduced vibrations, but at which there is lateral vibration, that is, vibration in the horizontal direction, as viewed in FIG. 1, with the amplitude of such lateral vibrations increasing with increasing distance from the axis of symmetry of each portion 24. Expressed in another way, the transmission of the vibrations from the input surface 21 to the output surface 22 may be considered as corresponding to the cyclic increase and decrease of the dimension $d$ of the blade-like vibration transmitting member, during which there is a corresponding cyclic decrease and increase, respectively, of the lateral dimension, that is, the width or length $l$ of the portion 24 at its nodal plane. If the adjacent portions 24 are joined together along their entire height or depth $d$, and particularly if they are joined together at or near the nodal plane P, the lateral vibrations of the adjacent portions 24 at the nodal plane P have complex interactions which interfere with the convenient realization of in-phase vibrations of uniform amplitude along the entire output surface 22.

In accordance with the present invention, the Poisson couplings causing such complex interactions between the adjacent portions 24 are broken by providing vibration transmitting member 20 with slots 25 extending through member 20 in planes which are perpendicular to the output surface 22 and which are at right angles to the direction of the large dimension L of the output surface. The slots 25 are located between the previously mentioned portions 24 of vibration transmitting member 20, that is, they are spaced from the ends of member 20, and from each other, by distances $l$ which are less than the critical lateral dimension for plane wave transmission through the material of which the member 20 is formed.

Since the portions 24 of member 20 are separated from each other at the nodal plane P by the slots 25, the individual portions 24 are free to expand and contract laterally at the nodal plane without interaction between the adjacent portions 24.

As is shown in FIG. 1, each of the slots 25 is spaced from the input and output surfaces 21 and 22 so as to leave connecting bridges 26 and 27 between the adjacent portions 24 of vibration transmitting member 20. Although the slots 25 are shown spaced from the input and output surfaces 21 and 22 in the illustrated embodiment, the slots 25 may open at either the input surface or the output surface, thereby leaving connecting bridges between the adjacent portions 24 only near one of such surfaces. The connecting bridges 26 and 27 provide couplings between the adjacent portions 24 at locations where such portions are vibrating exclusively in directions perpendicular to output surface 22 and input surface 21, and such couplings formed by the connecting bridges 26 and 27, or in some cases by the connecting bridges 26 alone, as when slots 25 open at the input surface, are sufficient to ensure that all of the vibrations along the output surface 22 will be in phase and of uniform amplitude, even though there may be slight differences between the frequencies and amplitudes of the vibrations introduced by the several vibratory mechanisms 23, for example, as a result of the variations inherent in the manufacturing tolerances employed in the production of such vibratory mechanisms.

If the vibration transmitting member is relatively thin, as is assumed to be the case with the blade-like member 20 of FIG. 1, that is, if it only has a relatively large dimension L in one direction in planes parallel to the input and output surfaces 21 and 22, then the slots 25 extend through the member 20 only transversely with respect to the direction of that large dimension L. However, if the vibration transmitting member has relatively large dimensions in two or more directions lying in planes parallel to the input and output surfaces, then an arrangement of slots is provided in which slots extend at right angles to the directions of all of the large dimensions. For example, as shown in FIGS. 10 and 11, a vibration transmitting member 20a embodying the present invention may be in the form of a block having a length L and a thickness L' which are both very much larger than the maximum lateral dimension for plane wave front transmission from the input surface 21 to the output surface 22 in the material of which member 20a is formed. In that case, member 20a is provided with spaced apart slots 25 extending therethrough at right angles to the direction of the dimension L, and also with spaced apart slots 25' extending through member 20a at right angles to the slots 25, that is, at right angles to the direction of the dimension L' so that vibration transmitting member 20a is substantially divided by slots 25 and 25' into portions 24a having generally square cross-sections in planes parallel to the input and output surfaces 21 and 22.

As in the first described embodiment of the invention, each portion 24a of vibration transmitting member 20a has a centrally located vibratory mechanism 23 for introducing vibratory energy at the input surface 21, and the slots 25 and 25' are spaced from each other and from the peripheral surfaces of member 20a by distances $l$ and $l'$, respectively, which are smaller than the maximum dimension for plane wave front transmission through the material in question.

In the member 20a described above with reference to FIGS. 10 and 11, the slots 25 and 25' are also spaced from the output and input surfaces so as to leave connecting bridges 26 and 27 (FIG. 11) between the adjacent portions 24a. Thus, as in the member 20 of FIG. 1, the arrangement of the slots in vibration transmitting member 20a is such as to break the Poissant couplings between the adjacent portions 24a, while the connecting bridges 26 and 27 are effective to ensure that the vibrations over the entire area of output surface 22 will be in phase and of uniform amplitude, even when there are slight differences between the frequency and amplitude of the vibrations introduced by the several vibratory mechanisms 23 at the input surface 21.

A preferred construction for each of the vibratory mechanisms 23 is illustrated in FIG. 12 of the drawings, in which it will be seen that the vibratory mechanism 23 includes a tubular casing 28 formed of a non-magnetic material, for example, of a molded plastic, such as, nylon or the like. Casing 28 is closed at one end, as by a plug 29, and is formed with an external, annular recess 30 extending along a substantial portion of the length of the casing from its closed end. A winding 31 of current conducting wire, such as, copper or the like, which is protected by an enamel coating is wound on the outside of casing 28 within recess 30 and is enclosed and protected by an outer jacket 32 which may be formed of extruded plastic tubing, and which telescopes over casing 28 and abuts, at one end, against an external shoulder 33 on the casing.

Each vibratory mechanism 23 further includes a mechanical vibrator made up of a transducer 34 dimensioned to be telescoped in casing 28 with substantial clearance therebetween, and with winding 31 in surrounding relation thereto. The transducer 34 may be any one of a number of electromechanical types, such as, electro-dynamic, piezo-electric or magnetostrictive, however, for the operating range of frequencies most desirable in connecttion with vibration transmitting members embodying the present invention, transducer 34 is preferably of the magnetostrictive type. The magnetostrictive transducer 34 is preferably formed of a metal, such as, permanickel, nickel, permendur, or other metals which have high tensile strength and are highly magnetostrictive in character, so that it will vibrate to a maximum degree when subjected to the influence of an alternating electromagnetic field established within casing 28 by the supplying of biased alternating current to the winding 31.

The transducer 34 illustrated in FIG. 12 comprises a stack of strips of the selected metal secured together at one end, as by a brazed key 35, while the other end of the transducer is rigidly fixed, as by brazing or soldering, to a longitudinally aligned connecting body 36 which may be in the form of an acoustic impedance transformer.

In place of the stack of metal strips forming the transducer 34, there may be substituted a bundle of metal wires or rods, preferably of rectangular cross-section, so that they can be compactly assembled together, a roll of metal foil, or a longitudinally split hollow metal tube. In any case, the length of the magnetostrictive transducer 34 is selected so that it will be a half-wavelength, or multiples thereof, at the frequency of the alternating electromagnetic field established within casing 28 by winding 31.

The connecting body 36 may be made of a strong metal, such as, steel, Monel metal, titanium, Phosphor bronze, brass or beryllium copper, and further includes a threaded stud 37 projecting axially from the end of connecting body 36 remote from transducer 34 and adapted to be screwed into a corresponding tapped bore formed in the input surface of the vibration transmitting member embodying the present invention. The length of connecting body 36 is also a half-wavelength, or multiples thereof, and is sufficiently great so that body 36 will project out of the open end of casing 28 remote from plug 29 when the mechanical vibrator is assembled to casing 28 with transducer 34 telescoped within the latter.

The mechanical vibrator is assembled to casing 28 by means of an O-ring 38 of rubber or the like which extends snugly about connecting body 36 and is received within a counterbore 39 formed at the open end of casing 28 and defining a radial shoulder 40 at the inner end of the counterbore against which O-ring 38 abuts. O-ring 38 is compacted axially, and hence urged into tight radial engagement with the surface of connecting body 36 and with the surface of counterbore 39, by means of a clamping sleeve 41 which extends axially into counterbore 39 and has a radially outwardly directed flange 42 at its outer end. A head 43 fits slidably over the closed end of casing 28 and abuts against the adjacent end of jacket 32 so as to hold the latter against shoulder 33. Flange 42 of clamping sleeve 41 and head 43 are urged axially toward each other by means of axially extending tie rods 44 which are threadably engaged at one end, as at 45, with the flange 42, while the other end portion of each tie rod 44 extends through a related axial bore 46 formed in head 43 and has a threaded end 47 for receiving a nut 48 that may be tightened in order to urge the clamping sleeve 41 axially into counterbore 39 and against O-ring 38.

O-ring 38 is positioned along connecting body 36 at a node of longitudinal vibration so that O-ring 38 can support the mechanical vibrator with respect to casing 28 while avoiding damping of the vibrations to be transmitted through connecting body 36 and casing 28. A suitable receptacle 49 carried by head 43 has tubes 50 and 51 extending therefrom through plug 29 and respectively forming an inlet and an outlet for a cooling fluid circulated through the interior of casing 28 in order to cool the transducer 34 which most effectively serves its purpose when maintained in a relatively cool condition. The cooling fluid is supplied to the inlet tube 50 and withdrawn from the outlet tube 51 through tubes 52 and 53, respectively, which are contained in a protective flexible conduit 54 having a plug or connector 55 at its end for engagement with receptacle 49. The flexible conduit 54 further contains wires 56 extending to suitable terminals (not shown) in plug 55 for engagement with corresponding terminals (not shown) in receptacle 49 which are connected to wire leads 57 by which the necessary biased alternating current is fed to winding 31.

As shown in FIG. 1, the windings 31 of the several vibratory mechanisms 23 are preferably connected in series to the generator G which is the source of the biased alternating current to be fed to the windings 31 so that the latter establish alternating electromagnetic fields for producing the desired vibrations in the related transducers 34.

From the foregoing, it will be apparent that the simultaneously operated vibratory mechanisms 23 can produce vibrations of high frequency and low amplitude having a plane wave front at the output surface of the vibration transmitting member. When the uniformly vibrated output surface 22 of the blade-like vibration transmitting member 20 is pressed against a moving surface, the effect of the uniform vibrations, for example, within a range of frequencies of 20,000 cycles per second to 60,000 cycles per second, and a range of amplitudes of between .0005 and .0015 inch, is to very greatly reduce the frictional resistance to movement of the surface engaged by the blade-like vibration transmitting member. This observed antifriction phenomenon of ultrasonically vibrated members leads to a number of very useful applications of vibration transmitting members embodying the present invention which are used as replacements for rollers or cylinders in various web processing machines.

More specifically, as shown in FIG. 2, a machine for coating a web W of paper or other sheet material may include a rotated cylinder 58 having trunnions 59 at its opposite ends journalled in side frame members 60, and around which the web W runs. A blade-like vibration transmitting member 120 constructed in accordance with the embodiment of the invention illustrated in FIG. 1, and having a rounded output edge or surface 122 (FIG. 8), is mounted adjacent one side of cylinder 58 in a manner hereinafter described in detail, with the longitudinal plane of symmetry of member 120 being inclined downwardly toward the surface of cylinder 58 and with the output edge 122 being urged against the latter so that a supply of coating substance S can be conveniently contained between the web W on the upper portion of cylinder 58 and the blade-like vibration transmitting member 120. As the web W is driven by cylinder 58 in the direction indicated by the arrows, the web moves through the supply S of coating substance and past the vibrated output edge or surface 122 and is provided with a uniform coating C. The supply S of coating substance may be deposited between cylinder 58 and blade-like member 120 from a spout 61 depending from a tank 62 and having a shut-off valve 63 interposed therein.

The output edge or surface 122 of blade-like member 120 may be urged against cylinder 58 by mounting member 120 for pivoting movement about its longitudinal axis contained within the nodal plane of member 120, and by urging member 120 to pivot about such axis in the clockwise direction, as viewed in FIG. 2, for example, by means of an arm 64 which is angularly fixed relative to blade-like member 120 and which is connected to one end of a tension spring 65 having its opposite end connected to an adjustment screw 66.

The uniform vibrations imparted to the outward edge or surface 122 of blade-like member 120 by operation of the related vibratory mechanisms 23 serve to very substantially reduce the frictional resistance offered by member 120 to the movement of web W, so that blade-like member 120 provides an effective substitution for the roller or cylinder usually employed in place thereof in conventional coating machines.

It will be seen in FIGS. 2 and 8 that the blade-like member 120 has a thickness at its input surface 121 which is greater than the thickness at the output surface 122 so that the member 120 acts as an acoustic impedance transformer to produce vibrations at the output surface 122 having an amplitude substantially greater than that of the vibrations received from the mechanical vibrator of each of the vibratory mechanisms 23.

It will also be apparent that, if blade-like member 120 is to be suspended from supports adjacent its opposite ends, for example, from the side frame members 60, a blade-like member of considerable length would normally be subjected to large bending forces, so that the output edge 122 would lose its desired straight character unless the thickness, and hence the mass, of the member 120 was adequate to substantially prevent flexing under such bending forces. In order to avoid the necessity of giving such large mass to member 120, and thereby increasing the power required for effecting the desired vibrations, the blade-like member 120 embodying this invention is preferably supported in a rigid rectangular frame 67 (FIGS. 6, 7 and 8) extending around member 120 and having trunnions 68 projecting from its opposite ends for rotational mounting in the side frame members 60. The member 120 is disposed within rigid frame 67 with the aligned axes of the trunnions 68 preferably lying in a nodal plane P (FIG. 7) of the vibrated blade-like member 120.

In order to mount member 120 within rigid frame 67 while avoiding interference with the vibration of the output edge or surface 122, such mounting is preferably accomplished by screws 69 which extend threadably through the opposite side portions of frame 67 (FIG. 6) and have conical inner ends engageable in conical recesses or seats 70 formed in the opposite sides of member 120 at locations which lie on the nodal plane P and which are centered with respect to the several vibratory mechanisms 23, that is, centered between the ends of member 120 and the adjacent slots 125 and also between the successive slots 125, as is apparent in FIG. 7. It will be apparent that, at the locations of the recesses or seats 70, there is no vibratory movement of member 120 so that the screws 69 can be firmly secured in such seats without affecting the character of the vibrations at the output edge or surface 122.

Another application of a vibrated, blade-like member 120 embodying the present invention is illustrated in FIG. 3, wherein the rigid frame 67 carrying member 120 has its trunnions 68 pivotally supported in the opposite side frame members 60 and the spring 65a connected between an adjustment screw 66a and the arm 64a extending from frame 67 urges the vibrated output edge or surface 122 of blade-like member 120 downwardly against the web W travelling over the rotated cylinder 58a so that the static force of the blade-like member 120 against the web W has a glossing or compacting action. Here again, the ultrasonic vibration of the output edge or surface 122 serves to very substantially reduce the frictional resistance to movement of the web.

Still another application of the invention is illustrated in FIG. 4, wherein two vibrated, blade-like members 120 embodying the present invention are used in place of conventional rollers for the purpose of guiding a web W along a predetermined path between two points, for example, between a web supply roll 71 and any conventional apparatus 72 for treating the web. By reason of the vibrations imparted to the edge of each member 120 in guiding contact with the web W, the members 120 normally offer very little frictional resistance to movement of the web. However, as soon as the vibratory mechanisms 23 are rendered inoperative, for example, by interrupting the supply of biased alternating current to the windings thereof, the blade-like members 120 present an immediate frictional drag or braking effect on the web W, so that the members 120 embodying this invention are particularly suited as replacements for guiding rollers in situations where intermittent movement of the web is desired. It is also to be noted that, when the blade-like members 120 are employed in place of rollers for guiding an intermittently moving web, the commencement of vibration of each member 120 and the anti-friction effect thereof can be made accurately simultaneous with the commencement of movement of the web to avoid any drag resisting such initial movement, whereas, the conventional rollers intended to be replaced by the members 120 have rotational inertia that must be overcome during initial movement of the web.

The above mentioned applications of vibration transmitting members embodying the present invention have all depended upon the anti-friction effect resulting from the uniform vibration of the output surface of the vibration transmitting member when in contact with a moving surface. However, the attainment of uniform vibrations along the entire output surface makes vibration transmitting members embodying this invention advantageously suitable for other purposes. Thus, as shown in FIG. 9, a blade-like vibration transmitting member 220 embodying the present invention and having transversely extending slots 225 dividing the portions thereof receiving vibratory energy from vibratory mechanisms 23 at the input surface 221, may have a flat output surface 222 which is uniformly vibrated and which, when pressed against a metal surface or the like, is effective to machine or cut a correspondingly shaped elongated groove in such metal surface. If the output edge or surface 222 of the blade-like vibration transmitting member 220 is formed with a pointed or sharp edge, then the member 220 can be employed as an ultrasonically vibrated knife blade for slitting materials that are not readily cut by knife blades to which only a static load is applied.

The block-shaped vibration transmitting member 20a which has been previously described in connection with FIGS. 10 and 11 is also admirably suited for machining or surfacing operations, since the uniform vibrations produced over the entire output surface 22 of the member 20a will ensure that the material against which that output surface is applied to cut to a uniform depth over the entire, large area of the member 20a.

Still another application of a vibration transmitting member embodying the present invention is illustrated in FIG. 5, wherein the member 320 has spaced apart slots 325 extending therethrough to break the Poisson couplings between the successive portions which are vibrated, at the input surface 321, by means of vibratory mechanisms 23, so that the output surface 322 is uniformly vibrated, and suitably shaped and spaced apart ultrasonic machining tools 73, for example, drills or the like, are rigidly fixed to the output surface 322. Thus, the individual tools 73 are also uniformly vibrated and are adapted for performing simultaneous operations, for example, the gang drilling of a structural member.

From the above, it will be apparent that the present invention provides a convenient means for achieving the uniform ultrasonic vibration of the surface of a member having relatively large dimensions, through the use of a plurality of electro-mechanical transducers operated from a common energizing source or generator.

Although a number of embodiments and applications of the present invention have been described in detail herein with reference to the accompanying drawings, it is to be understood that this invention is not limited to those precise embodiments and applications, and that various changes and modifications may be effected therein, by one skilled in the art, without departing from the scope or spirit of the invention, except as defined in the appended claims.

What is claimed is:

1. The combination of an elongated, blade-like vibration transmitting member having input and output surfaces at the opposite longitudinal edges thereof, and a plurality of vibratory mechanisms introducing high frequency standing waves in said member at spaced apart locations along said input surface, the distance between said edges being equal to an integral number of half-wave lengths so that loops of motion appear at said surfaces with at least one nodal plane therebetween, said member having slots extending transversely therethrough across said nodal plane in planes which are perpendicular to said edges and located between said vibratory mechanisms to break the Poisson couplings between the portions of said member at the opposite sides of each slot, said input and output surfaces having different transverse dimensions so that said blade-like member acts as an acoustic impedance transformer to emit vibrations at said output surface having an amplitude that is different from the amplitude of the vibrations introduced at said input surface.

2. In a machine having a moving web therein, a member for contact with the web including an elongated, blade-like body engageable, at one of the longitudinal edges thereof, with the moving web, and means operating to vibrate said one longitudinal edge uniformly along the entire length of the latter at a high frequency and with a low amplitude so as to substantially reduce the frictional resistance to movement of the web by said body.

3. A member for contact with a moving web including an elongated, blade-like body engageable, at one of its longitudinal edges, with a moving web, means introducing vibrations into said body at the other longitudinal edge of the latter for transmission through said body to cause said one edge to vibrate uniformly along the entire length thereof for substantially reducing the frictional resistance to movement of the web by said body, said body having a nodal plane between the longitudinal edges thereof, and means supporting said body including a rigid frame extending around said body and clamping elements carried by the opposite sides of said frame and in clamping engagement with said body at said nodal plane of the latter so as to avoid interference with the transmission of the vibrations through said body.

4. A member for contact with a moving web as in claim 3; wherein said elongated, blade-like body has spaced apart slots extending transversely therethrough in planes that are perpendicular to said longitudinal edges to substantially divide said body into equal portions; and wherein said means introducing vibrations includes electro-mechanical vibration generating devices connected to said other longitudinal edge of the body at spaced apart locations which are centered with respect to said substantially divided portions.

5. A member for contact with a moving web as in claim 4; wherein said clamping elements carried by the frame engage said body at points lying in transversely extending planes that also contain said locations of the vibration generating devices.

6. The combination of an elongated, blade-like vibration transmitting member having input and output surfaces at the opposite longitudinal edges thereof, a plurality of vibratory mechanisms introducing high frequency standing waves in said member at spaced apart locations along said input surface, the distance between said edges being equal to an integral number of half-wavelengths so that loops of motion appear at said surfaces with at least one nodal plane therebetween, said input and output surfaces having different transverse dimensions so that said blade-like member acts as an acoustic impedance transformer to emit vibrations at said output surface having an amplitude that is different from the amplitude of the vibrations introduced at said input surface, said member having slots extending transversely therethrough across said nodal plane in planes which are perpendicular to said edges and located between said vibratory mechanisms to break the Poisson couplings between the portions of said member at the opposite sides of each slot, a supporting frame structure extending along said blade-like member, and clamping elements suspending said blade-like member from said frame structure and engaging the opposite sides of said blade-like member at locations lying in a nodal plane of the latter and being disposed in transverse alignment with at least some of said vibratory mechanisms so as to avoid interference with the transmission of vibrations through said blade-like member.

7. The combination of an elongated, blade-like vibration transmitting member having input and output surfaces at the opposite longitudinal edges thereof, and vibration generating means attached to said input surface and introducing high frequency standing waves in said member, the distance between said edges being equal to an integral number of half-wavelengths so that loops of motion appear at said surfaces with at least one nodal plane therebetween, said member having slots extending therethrough across said nodal plane in transverse planes which are perpendicular to said edges and uniformly spaced apart by distances smaller than one-third the wavelength of the vibrations to be transmitted, thereby to break the Poisson couplings between the portions of said member at the opposite sides of each slot, said output surface being relatively narrow and said input surface being relatively wide so that said blade-like member acts as an acoustic impedance transformer to emit vibrations at said output surface having a substantially larger amplitude than that of the vibrations introduced at said input surface, while said relatively wide input surface further provides an adequate area for attachment of said vibration generating means and the requisite lateral structural rigidity for said blade-like member.

References Cited in the file of this patent

UNITED STATES PATENTS

| | | |
|---|---|---|
| 1,881,014 | Ayers | Oct. 4, 1932 |
| 2,406,767 | Hayes | Sept. 3, 1946 |
| 2,723,386 | Camp | Nov. 8, 1955 |
| 2,880,404 | Harris | Mar. 31, 1959 |